United States Patent [19]

Kurokawa

[11] Patent Number: 4,869,657
[45] Date of Patent: Sep. 26, 1989

[54] MAGNETIC PUMP OF A PHOTOGRAPHIC PROCESSING BATH

[75] Inventor: Toshio Kurokawa, Tokyo, Japan

[73] Assignee: Fuji Photo Film Co., Ltd., Kanagawa, Japan

[21] Appl. No.: 247,214

[22] Filed: Sep. 21, 1988

Related U.S. Application Data

[63] Continuation of Ser. No. 93,659, Sep. 8, 1987, abandoned.

[30] Foreign Application Priority Data

Sep. 5, 1986 [JP] Japan .................................. 61-136427
Sep. 5, 1986 [JP] Japan .................................. 61-209188

[51] Int. Cl.⁴ ............................................. F04B 39/00
[52] U.S. Cl. .......................... 417/423.14; 417/423.15; 366/137; 366/263
[58] Field of Search ............ 417/423 M, 423 P, 423 B, 417/423 L, 423 T; 354/331, 332, 333, 336; 366/137, 263, 264, 265; 310/86, 268

[56] References Cited

U.S. PATENT DOCUMENTS

| | | | |
|---|---|---|---|
| 1,233,569 | 7/1917 | Graemiger | 417/420 |
| 2,709,965 | 6/1955 | Litzenberg | 417/423 P |
| 2,846,951 | 8/1958 | Metral et al. | 310/268 |
| 2,875,694 | 3/1959 | Carter | 417/423 P |
| 3,114,323 | 12/1963 | Moser | 417/423 P |
| 4,408,891 | 10/1983 | Schirk et al. | 366/265 |
| 4,660,988 | 4/1987 | Hara et al. | 366/137 |

Primary Examiner—Carlton R. Croyle
Assistant Examiner—Eugene L. Szczecina, Jr.
Attorney, Agent, or Firm—Sughrue, Mion, Zinn, Macpeak & Seas

[57] ABSTRACT

A magnetic pump in which a fluid is driven by means of an impeller. A stator which is adapted to rotate, through the medium of a magnetic force, a magnetic rotor attached to the impeller is disposed so as to face the magnetic rotor through a non-magnetic partition wall.

20 Claims, 4 Drawing Sheets

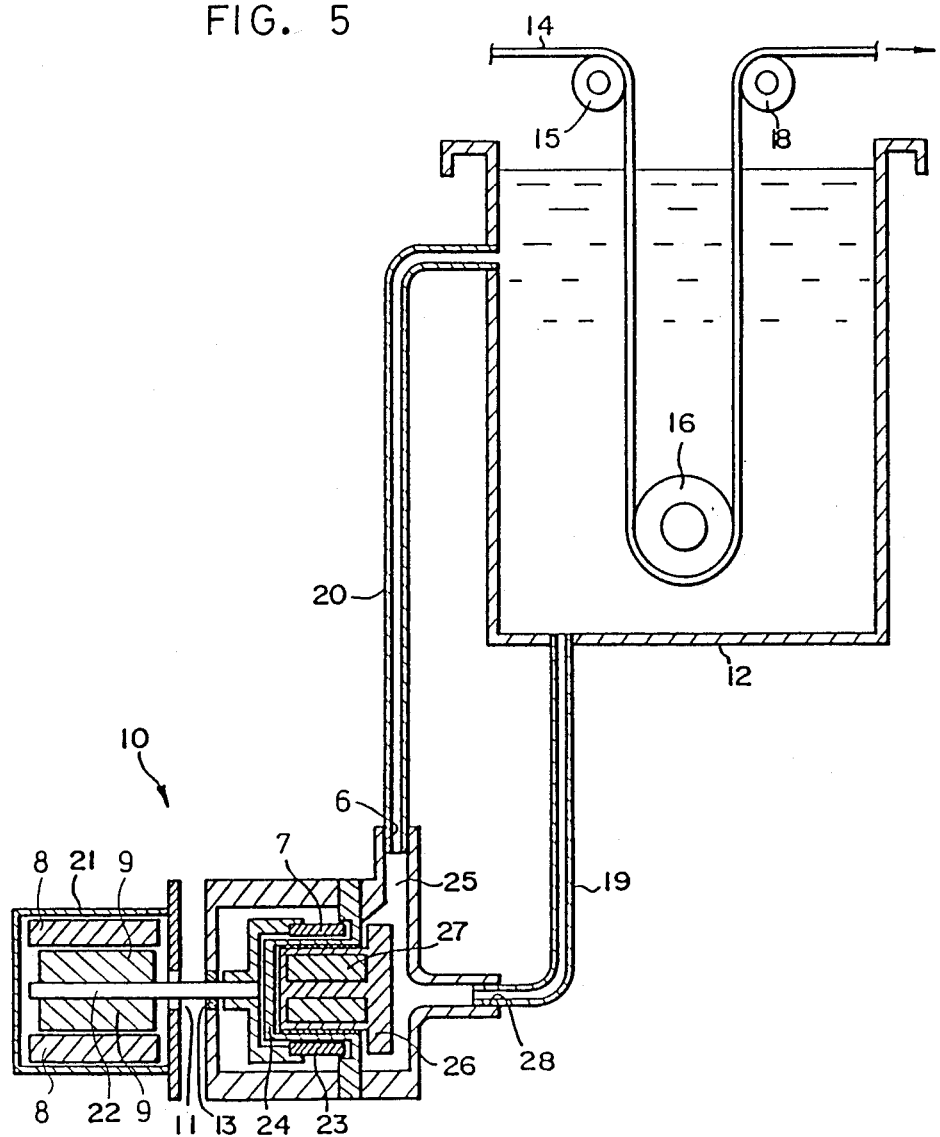

MAGNETIC PUMP OF A PHOTOGRAPHIC PROCESSING BATH

This is a continuation of application Ser. No. 07/093,659 filed 9/8/87 now abandoned.

BACKGROUND OF THE INVENTION

This invention relates to a magnetic pump in which a driving force is transmitted to an impeller through the medium of a magnetic force.

FIG. 5 shows a conventional magnetic pump 10 and a photographic processing bath 12 to which the pump 10 has been applied. The pump 10 is constituted by a motor unit 21 and a pump unit 7. A rotor 9 and an output shaft 22 attached to the rotor 9 are rotated by the rotation of a stator 8 of the motor unit 21. In the pump unit 7, driving magnetic body 23 which is attached to the output shaft 22 rotates outside a non-magnetic partition wall 24 so that the driving force acts, as a magnetic force, on a driven magnetic body 27 which is attached to an impeller 26 accommodated in an impeller chamber 25, thereby rotating the impeller 26.

A processing liquid such as developer in the photographic processing bath 12 is drawn through an inlet 28 and is discharged from an outlet 6. In the pump 10, the motor unit 21 and the impeller chamber 25 are isolated from each other by the partition wall 24 so as to prevent any leak of the processing liquid from the impeller chamber and prevent seal packings 11 and 13 from being attacked by the developer or the like.

In the processing liquid, which is agitated by the pump 10 applied to the photography processing bath 12 in which a photosensitive medium 14 is transported by rollers 15, 16 and 18 while being immersed in the processing liquid or developer so as to effect development, it is necessary to interconnect the processing bath 12 and the pump 10 by an inlet pipe 19 and a discharge pipe 20.

The above-described type of magnetic pump is designed to separate the motor unit and the pump unit from each other, so that the number of parts and the size of the pump itself are large. In addition, a photography processing bath to which this type of pump is applied requires the provision of pipes for interconnecting the pump and the bath. The number of parts of this bath system is thereby increased and the piping thereof becomes complicated, resulting in an increase in the overall size of the bath system.

SUMMARY OF THE INVENTION

It is an object of the present invention to provide, in consideration of the above-described facts, a small-sized magnetic pump consisting of a small number of parts.

To this end, the present invention provides a magnetic pump comprising: an impeller for driving a fluid; an impeller chamber for accommodating the impeller; a magnetic rotor supported on the impeller; a stator disposed so as to face the magnetic rotor and adapted to apply a rotational force to the magnetic rotor through the medium of a magnetic force; and a non-magnetic partition wall disposed between the stator and the magnetic rotor so as to isolate the stator from the impeller chamber.

In this arrangement, the magnetic rotor has the same function as that of a magnetic rotor of a motor; and the stator has the same function as that of a stator of the motor.

The stator operates to apply a driving force of the magnetic rotor fixed to the impeller through the medium of a magnetic force acting though a non-magnetic partition wall, thereby rotating the impeller. Since the magnetic rotor is driven by the stator through the non-magnetic partition wall, the stator of the motor also has the function of the driving magnetic body of the conventional magnetic pump, thereby enabling a reduction in the number of component parts and a reduction in the size.

Other objects and features of the present invention will become clear upon reading the following description.

BRIEF DESCRIPTION OF THE DRAWINGS

FIG. 2 is a cross-sectional view of a third embodiment of the present invention;

FIG. 5 is a cross-sectional view of a conventional magnetic pump and a development bath.

DESCRIPTION OF THE PREFERRED EMBODIMENTS

Figure 1:
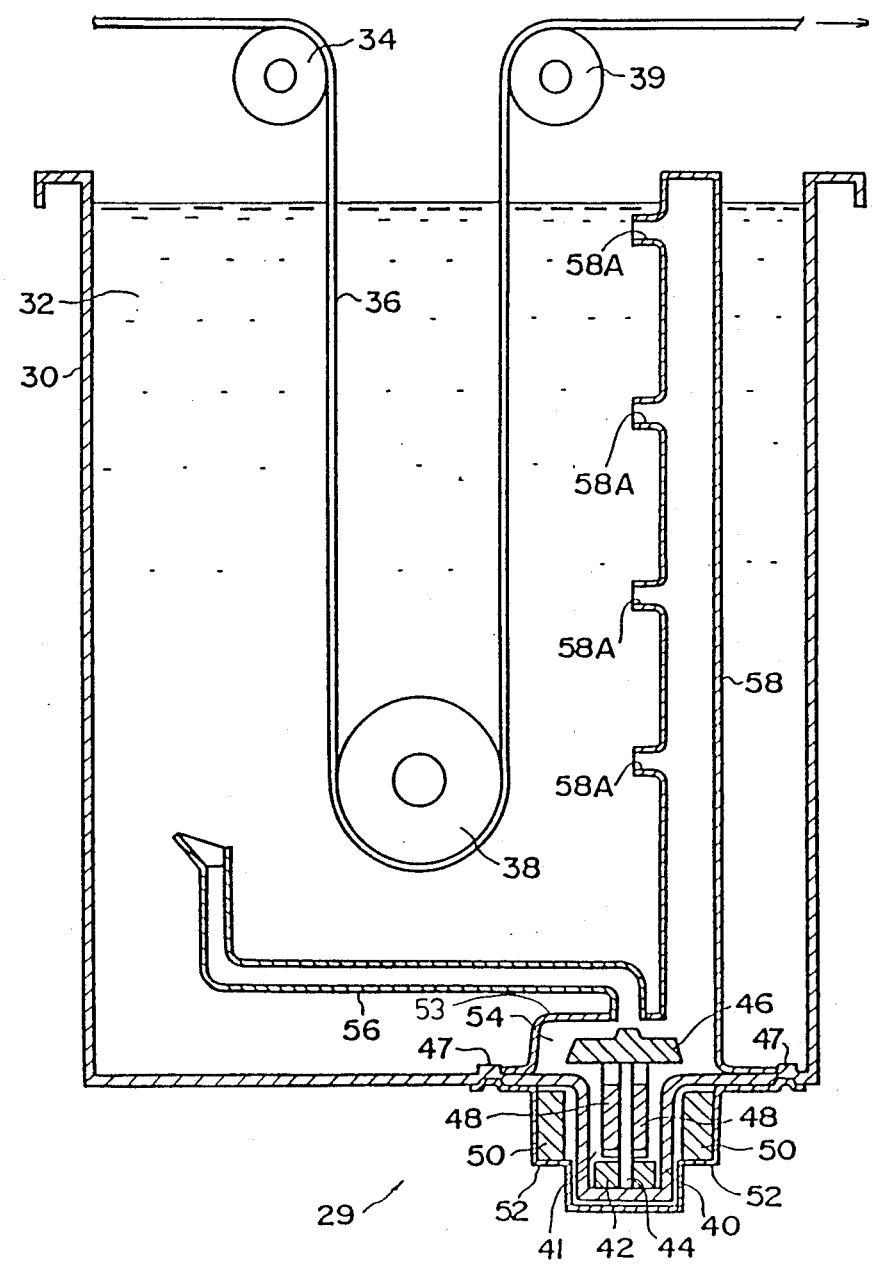
FIG. 1 is a cross-sectional view of a magnetic pump and a development bath which represent an embodiment of the present invention.

Referring first to FIG. 1, a magnetic pump 29 which represents a first embodiment of the present invention is applied to a development bath 30 which is used to develop a photosensitive medium, namely, a type of photography processing bath. The development bath 30 which may be formed from a plastic non-magnetic material has an upwardly facing opening and a rectangular cross-sectional configuration. The main body of the bath 30 is filled with a developing solution 32. A photosensitive medium 36 which has been transported from the preceding processing stage (not shown) while being guided by a supply roller 34 is being immersed in the developing solution 32. The photosensitive medium 36 is reversed by a reversing roller 38 disposed in the development solution 32, is guided by a supply roller 39 and is transported to the next processing stage.

A part of the bottom of the bath body 30 is deformed so as to form a bent portion 40 namely a packet which extends in the direction of extension of the bath and which constitutes a nonmagnetic partition wall. A cylindrical recess 41 having a vertical axis is formed in the bent portion 40. The bent portion 40 can be integrally formed together with the bath body 30 if the bath body 30 is formed from a plastic nonmagnetic material, as mentioned above. If the bath body is made of a magnetic material, only the bent portion 40 is made of a non-magnetic material and is attached to the bath body 30.

A bearing 42 is fixed to the inner bottom surface of the bent portion 40, and a rotary shaft 44 of an impeller 46 is axially supported by the bearing 42. A driven magnetic body 48 which constitutes a magnetic rotor is attached to an intermediate portion of the rotary shaft 44. A driving magnetic body 50 which constitutes a stator is mounted by a bracket 52 on the bath body such that it is coaxial with the driven magnetic body 48. The bracket 52 is fixed to the outside surface of a bottom portion of the bath body 30 so as to cover the bent portion 40.

The driving magnetic body 50 consists of coils which are formed of a multiplicity of layers of conducting wire windings and is connected to a power source (not shown). The driving magnetic body 50 generates a magnetic force when energized and drives the driven magnetic body 48 by electromagnetic induction, thereby rotating the impeller 46.

A cover 53 is adapted to cover the impeller 46, and an impeller chamber 54 is formed between the bottom wall of the bath body 30 and the cover 53.

One end of a duct 56 is connected to the cover 53. The other end of the duct 56 is extended upward, and the top end opening thereof serves as an inlet of the developing solution 32. The cover 53 is also connected to one end of a duct 58 so that a quantity of developing solution 38 in the impeller chamber 54 is discharged into the bath.

The duct 58 is extended upward in a parallel relationship with a part of the photosensitive medium 36 which is reversed and transported upward by the reversing roller 38. A plurality of discharge holes 58A are formed in the surface of the duct 56 which faces the photosensitive medium 36 along the direction of transportation of the photosensitive medium 36 so that the developing solution 32 can be discharged toward the photosensitive medium 36. The developing solution 32 is thereby agitated at the surface of the photosensitive medium 36 so as to prevent any stagnation of the developing solution 32, thereby ensuring a good performance of development process.

The opening edge of the cover 53 is bent, and the cover 53 is fitted at this portion to a recess 47 formed in a bottom portion of the bath body 30. However, other types of attachment structure such as that in which a groove is formed in a bottom portion of the bath body 30 and the edge of the cover 53 is fitted into this groove are also possible.

In this embodiment, the cover 53 and the ducts 56 and 58 are formed as separate members and are thereafter fixed to each other, but these members may be formed integrally.

The operation of this embodiment will now be described below.

A photosensitive medium 36, which is transported from a preceding processing stage (not shown), is immersed in the developing solution 32 while being guided by the supply roller 34, is reversed by the reversing roller 38 and is transported by the supply roller 39 to the next processing stage after undergoing development. On the other hand, in the magnetic pump 29, the impeller 46 is rotated by the rotation of the driven magnetic body 48 which is driven by the driving magnetic body 50. As the impeller rotates, the developing solution 32 is drawn through the duct 56 and is supplied to the duct 58, thereby discharging the development solution 32 through the discharge holes 58A. Accordingly, the developing solution 32 is agitated at the surface of a reversed portion of the photosensitive medium 36 by the flows which have been discharged from the discharge outlets 58A toward the photosensitive medium 36, thereby enabling a good performance of development process.

The driven magnetic body 48 and the driving magnetic body 50 are isolated from each other by the bent portion 40 of the bath body 30 and, therefore, there is no possibility of the driving magnetic being in contact with the developing solution 32 and, hence, being attacked by the development solution.

Next, the present invention will be described below with respect to a second embodiment thereof.

Figure 2:
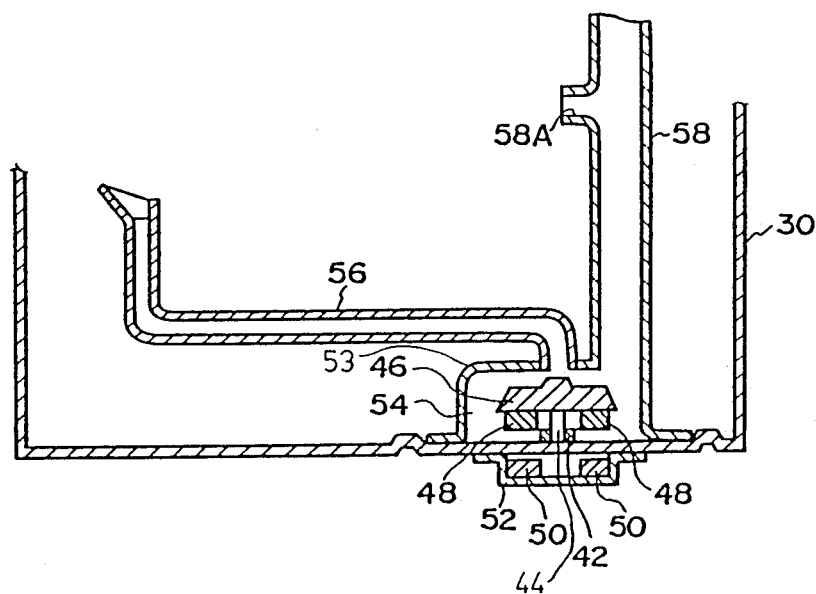
FIG. 2 is a cross-sectional view of a second embodiment of the present invention.

As shown in FIG. 2, the construction of the bath body 30 in this embodiment is different from that of the first embodiment and the bath body 30 does not project in the direction of extension thereof. That is, a bearing 40 is attached to the inside surface of a flat bottom portion of the bath body 30, and an impeller 46 is axially supported by this bearing 42. A driven magnetic body 48 is coaxially attached to the impeller 46 around a rotary shaft 44. A driving magnetic body 50 is disposed outside the bath body 30 in a position corresponding to that of the driven magnetic body 48 and is mounted on the bath body 30 by a bracket 52 which is attached to the outside surface of the bottom portion of the bath body 30. The driving magnetic body 52 and the driven magnetic body 48 are disposed so as to face each other with the bottom portion of the bath body 30 interposed therebetween, both the opposed surfaces of these magnetic bodies being horizontal. The driving magnetic body 50 is connected to a power source (not shown) as in the case of the first embodiment and is adapted to generate a magnetic force when energized so as to drive the driven magnetic body 48 by electromagnetic induction.

The impeller 46 is thereby rotated in the same manner as that of the first embodiment, the developing solution 32 is drawn through the duct 56 and is then discharged through the discharge holes 58A of the duct 58 so that the development solution 32 is agitated at the surface of the photosensitive medium 36, thereby enabling a good performance of development process.

Figure 3:
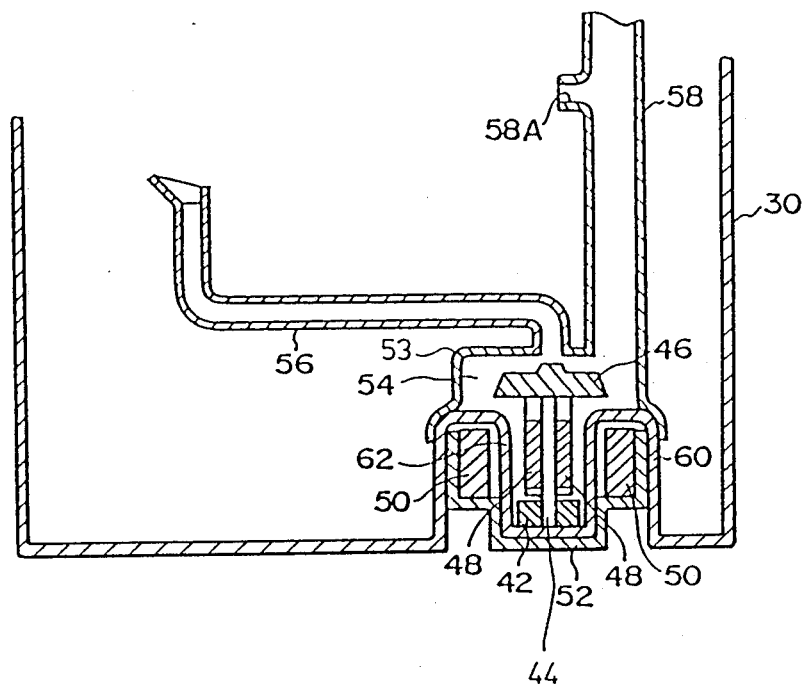

FIG. 3 shows a third embodiment of the present invention in which the bath body 30 has a cylindrical large-diameter bent portion 60 which is formed by inwardly bending a bottom portion of the bath body 30. A smalldiameter bent portion 62 is formed so as to coaxially extend in the large-diameter portion 60 from a top portion thereof to the outside of the bath 30. The cavity which is formed inside the small-diameter portion 62 is communicated with an impeller chamber 54. The space which is formed between the large-diameter portion 60 and the smalldiameter portion 62 has an annular shape, and a driving magnetic body 50 is mounted in this space by a bracket 52. A driven magnetic body 48 is disposed inside the smalldiameter bent portion 62 in a position corresponding to that of the driving magnetic body 50. The driven magnetic body 48 is attached to a rotary shaft 44 of the impeller 46 which is axially supported by a bearing 42 which is attached to the inner bottom surface the small-diameter portion 62.

The driving magnetic body 50 is connected to a power source (not shown) as in the case of the above-described embodiments and is adapted to generate a magnetic force when energized so as to drive the driven magnetic body 48 by electromagnetic induction.

The impeller 46 is thereby rotated in the same manner as that of the first embodiment, the developing solution 32 is drawn through the duct 56 and is then discharged through the discharge holes 58A of the duct 58 so that the development solution 32 is agitated at the surface of the photosensitive medium 36, thereby enabling a good performance of development process.

Since in the third embodiment the magnetic pump is formed by inwardly bending a bottom portion of the bath body 30, the bath body 30 has no bottom projection which projects in the direction of extension of the bath body 30.

Figure 4:
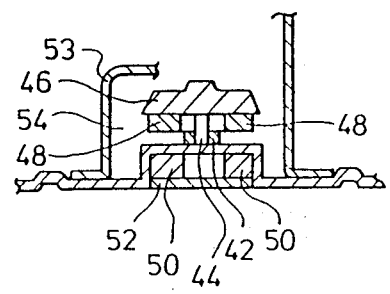
FIG. 4 is a cross-sectional view of a part of an example of the construction in accordance with the present invention.

In another possible construction of the present invention, a bent portion of the bath body 30 is formed in the direction reverse to that in the second embodiment; a driving magnetic body 50 is disposed inside the cavity of this bent portion; and a driven magnetic body 48 is disposed around the outer peripheral surface of the bent portion. FIG. 4 shows an example of this construction.

In the first to third embodiments of the present invention, the magnetic pump 29 is mounted on the body of the development bath 30, but it can be mounted on other types of processing bath such as a fixing bath, a washing bath and a stabilizing bath.

What is claimed is:

1. A magnetic pump comprising:
   a photographic processing bath having a non-magnetic bottom wall;
   an impeller chamber integrally formed with said photographic processing bath as a part of said bottom wall, said bottom wall having an inwardly bent recessed portion defining said impeller chamber such that said impeller chamber is completely disposed internally of said bottom wall so as to not protrude therefrom;
   a magnetic rotor supported on said impeller;
   a stator oppositely and outwardly disposed at a portion apart from said rotor with an interval therebetween through said non-magnetic bottom wall so as to face said magnetic rotor and be isolated from said impeller chamber, said stator being adapted to apply rotational force to said magnetic rotor due to magnetic force; and
   a cover removably disposed on said bottom wall of said photographic processing bath to define said impeller chamber said cover having means for circulating solution, an integrally formed inlet duct, an inlet opening, a discharge duct, and a plurality of discharge holes, said discharge holes being longitudinally disposed along said discharge duct to face toward a conveying path of a photosensitive medium.

2. A magnetic pump according to claim 1, wherein a bearing is attached to said nonmagnetic partition wall; and a rotary shaft of said impeller is axially supported by said bearing.

3. A magnetic pump according to claim 2, wherein said photographic processing bath is made of non-magnetic material and has a impeller chamber defined by said impeller chamber, said magnetic rotor being disposed in said pocket, and said magnetic stator being disposed at an outside portion of said impeller chamber with an interval between said rotor and stator.

4. A magnetic pump according to claim 3, wherein said photographic processing bath has a recess, said impeller chamber being defined downward by said recess, said magnetic stator being disposed along an outer periphery of said impeller chamber, and said magnetic rotor being disposed in said impeller chamber.

5. A magnetic pump according to claim 1, wherein said impeller chamber is constituted by a cover for covering said impeller and said non-magnetic partition wall.

6. A magnetic pump according to claim 1, wherein said wall constitutes said processing bath which is filled with a photography processing liquid and in which a photosensitive medium is processed.

7. A magnetic pump according to claim 6, wherein said nonmagnetic partition wall has a projecting portion which projects in the direction of extension of said processing bath, and wherein said magnetic rotor is accommodated inside said projecting portion; and said stator is disposed outside said projecting portion.

8. A magnetic pump according to claim 1, wherein said means for circulating has a circulating duct associated with said cover, said cover being sealingly and removably mounted on said impeller chamber.

9. A magnetic pump according to claim 6, wherein said cover is provided with a duct which communicates with said impeller chamber and which allows said processing liquid to flow toward said photosensitive medium.

10. A magnetic pump according to claim 6, wherein said nonmagnetic partition wall has a projecting portion which projects in the direction of contraction of said processing bath, and wherein said stator is disposed inside said projecting portion; and said magnetic rotor is disposed outside said projecting portion.

11. A magnetic pump according to claim 6, wherein said nonmagnetic partition wall has an annular raised portion raised in the direction of contraction of said processing bath; said stator is disposed in said raised portion; and said magnetic rotor is disposed in a space encircled by said raised portion.

12. A magnetic pump according to claim 6, wherein said non-magnetic partition wall is constituted by at least a part of the bottom wall of said processing bath, and wherein said magnetic rotor is disposed inside of said processing bath; and said stator is disposed outside said processing bath.

13. A magnetic pump comprising:
   a non-magnetic partition wall forming at least a part of a photographic processing bath filled with photographic processing liquid in which a photosensitive medium is processed;
   an impeller chamber integrally formed with a part of a bent bottom wall of said photographic processing bath, said bottom wall having an inwardly bent recessed portion defining said impeller chamber such that said impeller chamber is completely disposed internally of said bottom wall so as to not protrude therefrom;
   an impeller disposed in said impeller chamber;
   magnetic rotor supported on said impeller;
   a stator oppositely disposed at a portion apart from said magnetic rotor through said non-magnetic bent bottom wall and adapted to apply rotational force due to magnetic force to said magnetic rotor; and
   means for circulating said processing liquid in said bath, said circulating means having an integrally provided cover, a first duct, an inlet opening provided to said first duct, a second duct, and a plurality of discharge openings provided to said second duct, and being removably disposed upon the impeller chamber, said discharge openings being longitudinally disposed along said second duct to face toward a conveying path of a photosensitive medium.

14. A magnetic pump according to claim 13, wherein said non-magnetic partition wall has a raised portion which is raised in the direction of extension of said processing bath, and wherein said magnetic rotor is disposed inside said raised portion; and said stator is disposed outside said raised portion.

15. A magnetic pump according to claim 13, wherein said non-magnetic partition wall has a raised portion which is raised in the direction of contraction of said processing bath, and wherein said stator is disposed inside said raised portion; and said magnetic rotor is disposed outside said raised portion.

16. A magnetic pump according to claim 13, wherein said non-magnetic partition wall has an annular raised portion raised in the direction of contraction of said processing bath; said stator is disposed in said raised portion; and said magnetic rotor is disposed in a space encircled by said raised portion.

17. A magnetic pump according to claim 13, wherein said cover is sealingly and removably mounted on said impeller chamber.

18. A magnetic pump according to claim 17, wherein said cover is provided with a duct which communicates with said impeller chamber and which guides said processing liquid in the direction of said photosensitive medium.

19. A magnetic pump accordingly to claim 13, wherein said impeller chamber is formed on a part of a major bottom wall of said photographic processing bath above a level of the remainder of said major bottom wall.

20. A magnetic pump comprising:
a wall of a photographic processing bath made of non-magnetic material;
an impeller chamber integrally formed by a portion of said non-metallic wall of said photographic processing bath, said impeller chamber being covered with a cap, said wall having an inwardly bent recessed portion defining said impeller chamber such that said impeller chamber is completely disposed internally of said bottom wall so as to not protrude therefrom;
a magnetic rotor disposed with a rotary shaft in said impeller chamber;
an impeller supported on said rotary shaft;
a stator disposed outside of said impeller chamber, being apart from said magnetic rotor so as to face said magnetic rotor through said non-magnetic wall of said impeller chamber and adapted to apply rotational force to said magnetic rotor due to magnetic force; and
a cover removably disposed on said wall to define said impeller chamber, said cover having first and second ducts, an inlet opening provided to said first duct, and a plurality of discharge openings, said discharge openings being longitudinally disposed along said second duct to face toward a conveying path of photosensitive medium, wherein photographic processing liquid in said photographic processing bath is flowed and circulated by said impeller in said bath through said first and second ducts and openings.

* * * * *